US012780187B2

(12) United States Patent
Akimoto

(10) Patent No.: US 12,780,187 B2
(45) Date of Patent: Nov. 3, 2026

(54) VEHICLE CONTROLLER

(71) Applicant: TOYOTA JIDOSHA KABUSHIKI KAISHA, Aichi-ken (JP)

(72) Inventor: Hikaru Akimoto, Mishima (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 19/242,982

(22) Filed: Jun. 19, 2025

(65) Prior Publication Data

US 2026/0001533 A1 Jan. 1, 2026

(30) Foreign Application Priority Data

Jun. 28, 2024 (JP) ................................ 2024-104959

(51) Int. Cl.
*B60W 30/09* (2012.01)

(52) U.S. Cl.
CPC ..... *B60W 30/09* (2013.01); *B60W 2554/4029* (2020.02); *B60W 2554/4042* (2020.02); *B60W 2720/106* (2013.01)

(58) Field of Classification Search
None
See application file for complete search history.

(56) References Cited

U.S. PATENT DOCUMENTS

2019/0034742 A1* 1/2019 Gokan .................. G01S 13/931
2021/0229681 A1* 7/2021 Adam .................. G01S 13/865
2024/0061424 A1* 2/2024 Kim ...................... B60W 30/09

FOREIGN PATENT DOCUMENTS

JP 2020-019301 A 2/2020

* cited by examiner

*Primary Examiner* — Davin Seol
(74) *Attorney, Agent, or Firm* — HAUPTMAN HAM, LLP

(57) ABSTRACT

A vehicle controller having a processor, wherein the processor is configured so as to execute the following processing: perform matching processing for matching first recognition results based on a first detection value for the object, and second recognition results based on a second detection value for the object, execute the avoidance assistance control in case of matching results of the object in the matching processing match and it is determined that the object is a pedestrian for whom the avoidance assistance control is necessary, and in case of a matching match count by the matching processing is equal to or greater than a threshold, and reduce the threshold for the matching match count in case of a condition under which recognition accuracy of the object is decreased as compared to a normal state is satisfied in the environment of the surroundings of the vehicle.

4 Claims, 7 Drawing Sheets

VEHICLE CONTROLLER

RELATED APPLICATIONS

The present application claims priority of Japanese Patent Application No. 2024-104959, filed Jun. 28, 2024, the disclosure of which is hereby incorporated by reference herein in its entirety.

FIELD

The present invention relates to a vehicle controller for protecting pedestrians.

BACKGROUND

In recent years, vehicle controllers for protecting pedestrians have been known (refer to, for example Patent Literature 1: Japanese Patent Publication No. 2020-019301). The vehicle controller described in Patent Literature 1 is configured so as to detect a person in front of a vehicle, and based on the speed of the vehicle and the stopping distance from the vehicle to a target position in front of the person, decelerate the vehicle at a second deceleration rate, which is less than a preset first deceleration rate, and stop the vehicle at the target position.

This vehicle controller detects an object using a first detection value of the object detected by a radar device and a second detection value of the object recognized by an image recognition device.

In case of an object is detected by the first detection value and the second detection value at the same time and in the same position, this vehicle controller determines that the same object is being detected, and by integrating these two detection values, the detection accuracy of the object is improved as compared to a method of detecting an object using a single detection value.

According to the vehicle controller described in Patent Literature 1, in a backlight state in which the lights of an oncoming vehicle are turned on and a state in which the lights of the vehicle are turned on, if a pedestrian is present between the vehicle and the oncoming vehicle, it may be difficult for the image recognition device to recognize the pedestrian. Thus, according to the vehicle controller described in Patent Literature 1, there is a risk that delays in the deceleration control of the vehicle may occur.

An object of the present invention is to provide a vehicle controller which can execute deceleration control of a vehicle even in a state in which it is difficult to recognize a pedestrian using an image recognition device.

Solution to Problem

An aspect of the present invention provides a vehicle controller for executing avoidance assistance control for causing a vehicle to decelerate or avoid in case of an object is recognized in front of the vehicle based on a first detection value and a second detection value for detecting an environment of surroundings of the vehicle, wherein a processor included in a computer which is mounted in the vehicle controller is configured so as to execute the following processing: perform matching processing for matching first recognition results based on the first detection value for the object, and second recognition results based on the second detection value for the object, execute the avoidance assistance control in case of matching results of the object in the matching processing match and it is determined that the object is a pedestrian for whom the avoidance assistance control is necessary, and in case of a matching match count by the matching processing is equal to or greater than a threshold, and reduce the threshold for the matching match count in case of a condition under which recognition accuracy of the object is decreased as compared to a normal state is satisfied in the environment of the surroundings of the vehicle.

According to the present invention, deceleration control of a vehicle can be executed even in a state in which it is difficult to recognize a pedestrian using an image recognition device.

DESCRIPTION OF EMBODIMENTS

Figure 1:
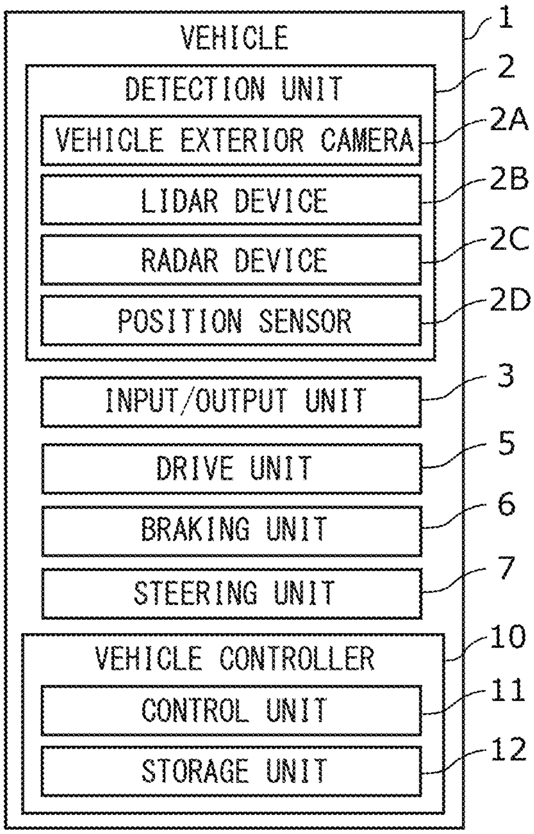
FIG. 1 is a block diagram showing the configuration of a vehicle controller according to an embodiment.

As shown in FIG. 1, the vehicle 1 comprises a detection unit 2 for detecting the surrounding environment. The vehicle 1 comprises a vehicle controller 10 for executing driving assist control based on detection values detected by the detection unit 2. The vehicle controller 10 is configured to execute deceleration control for decelerating the vehicle 1 in case of a pedestrian is detected based on the detection values.

The detection unit 2 comprises a vehicle exterior camera 2A for capturing the environment of the surroundings of the vehicle 1. The vehicle exterior camera 2A is installed, for example, so as to capture an imaging range in front of the vehicle 1. The detection unit 2 may comprise one or more vehicle exterior cameras 2A for capturing a predetermined imaging range of the surroundings of the vehicle 1. The vehicle exterior camera 2A captures objects such as pedestrians which are present in front of the vehicle 1 in the imaging range. The vehicle exterior camera 2A may be used not only for deceleration control but also for other driving assist control. The vehicle exterior camera 2A may be used as a drive recorder. The vehicle exterior camera 2A generates image data in which images of the environment of the surroundings of the vehicle 1 are captured and outputs the image data to the vehicle controller 10.

The detection unit 2 comprises a lidar device 2B for detecting objects in the surroundings of the vehicle 1. The lidar device 2B acquires three-dimensional data of the objects in the surroundings of the vehicle 1 by emitting, for example, laser beams within a scanning range and receives light reflected from the objects. The lidar device 2B acquires three-dimensional data of the environment of the surroundings of the vehicle 1 within the scanning range of the laser beams.

The detection unit 2 comprises a radar device 2C for detecting objects in the surroundings of the vehicle 1. The radar device 2C detects objects in the surroundings of the vehicle 1 by emitting, for example, millimeter-wave radar waves within a scanning range and measuring the reflected waves. The radar device 2C is configured so as to be capable of measuring the relative distances, relative speeds, and relative angles of objects such as pedestrians and vehicles.

The detection unit 2 is provided with a position sensor 2D for measuring the current position of the vehicle 1. The position sensor 2D is constituted by, for example, a GPS (Global Positioning System) sensor or the like. The position sensor 2D may be used in, for example, a navigation device. The position sensor 2D outputs measurement values to the vehicle controller 10.

The vehicle 1 comprises an input/output unit 3 for outputting a display image and accepting input operations from occupants. The input/output unit 3 is constituted by, for example, a display device such as a liquid crystal display or an organic EL (Electro-Luminescence). The input/output unit 3 is constituted by a touch panel. The input/output unit 3 accepts input operations by touching a displayed operation image. The input/output unit 3 displays, for example, a display image showing notification contents in case of driving assistance is executed. The input/output unit 3 may be configured so as to display the display contents of a navigation device provided in the vehicle 1.

The vehicle 1 comprises a drive unit 5 which serves as a drive source for traveling. The drive unit 5 may be constituted by an internal combustion engine or an electric motor. The drive unit 5 may be constituted by a hybrid device in which an internal combustion engine and an electric motor are combined. In case of the vehicle 1 is a manually driven vehicle, the drive unit 5 is controlled based on the operations by the driver, and under predetermined conditions, driving assist control for assisting the operations of the driver is executed by the vehicle controller 10. In case of the vehicle 1 is an autonomously driven vehicle, the drive unit 5 is controlled by the vehicle controller 10.

The vehicle 1 comprises a braking unit 6 for decelerating the vehicle 1. The braking unit 6 is constituted by, for example, a braking device. In case of the drive unit 5 is constituted by an electric motor, the braking unit 6 may be constituted by the drive unit 5. In this case, the drive unit 5 may be configured so as to generate regenerative power based on the deceleration energy of the vehicle 1 and to decelerate the vehicle 1.

The vehicle 1 comprises a steering unit 7 for receiving steering operations by the driver. The steering unit 7 is configured so as to impart a steering angle to steering wheels provided in the vehicle 1 in accordance with the amount of the steering operation by the driver. In case of the drive unit 5 is constituted by an electric motor, the steering unit 7 may be constituted by the drive unit 5. The steering unit 7 may be realized by controlling the drive wheels driven by the drive unit 5.

The vehicle controller 10 comprises a control unit 11 for executing control related to the traveling of the vehicle 1, and a storage unit 12 in which there are stored data and programs required for control. The control unit 11 is constituted by at least one hardware processor such as a CPU (Central Processing Unit). The storage unit 12 is constituted by a non-transitory storage medium such as a hard disk drive (HDD) or a solid-state disk (SSD). The storage unit 12 may store map data used in the navigation device.

The storage unit 12 stores detection value data output from the detection unit 2. The detection value data may be updated with new detection value data after having been stored for a predetermined period of time. In case of the control unit 11 recognizes an object such as a pedestrian in front of the vehicle based on the detection values for detecting the environment of the surroundings of the vehicle 1, the control unit 11 executes avoidance assistance control to decelerate the vehicle 1 or cause the vehicle 1 to perform avoidance.

The control unit 11 executes avoidance assistance control based on the detection values from the detection unit 2, which include, for example, imaging the data captured by the vehicle exterior camera 2A, the measurement value data from the lidar device 2B, and the measurement value data from the radar device 2C.

The control unit 11 recognizes the environment of the surroundings of the vehicle 1 based on, for example, determination processing using AI (Artificial Intelligence). The control unit 11 is configured so as to execute machine learning such as deep learning in advance using imaging data of the environment of the surroundings of the vehicle 1 as teacher data, and to extract an object present in front of the vehicle 1 based on a first detection value including imaging data captured by the vehicle exterior camera 2A. The control unit 11 executes a first determination processing to determine whether or not an object is present based on the first detection value including the imaging data.

The control unit 11 compares a plurality of sets of imaging data of the same environment included in the imaging range in a time series and extracts objects included in the imaging data. The objects may include moving objects, non-moving objects, operating objects, and non-operating objects. The control unit 11 recognizes the shapes, movements, colors, etc., of the extracted objects, and recognizes pedestrians present in front of the vehicle 1 from among the objects. The control unit 11 stores in the storage unit 12 first recognition results of the pedestrians extracted by the first determination processing based on the first detection value.

The control unit 11 may be configured so as to execute not only determination processing using AI, but also Simultaneous Localization and Mapping (SLAM) for generating an environment map for the current position of the vehicle 1 based on the imaging data and map data stored in the storage unit 12. The environment map is a reproduction of the surrounding environment of the current position of the vehicle 1 using three-dimensional data.

The control unit 11 executes SLAM and recognizes the environment of the surroundings of the vehicle 1 based on the generated environment map. The control unit 11 may recognize the environment of the surroundings of the vehicle 1 including objects present on the road by combining the imaging data with the detection values of the lidar device 2B and the radar device 2C. The control unit 11 may be configured so as to execute analysis based on another method as long as the environment of the surroundings of the vehicle 1 can be recognized.

The control unit 11 is configured so as to be capable of extracting an object present in front of the vehicle 1 based on a second detection value, which is different from the first detection value, including, for example, lidar data of the lidar device 2B acquired by scanning the environment of the surroundings of the vehicle 1. The control unit 11 may extract an object present in front of the vehicle 1 based on the second detection value including radar data of the radar device 2C.

The control unit 11 executes a second determination processing to determine whether or not an object is present in front of the vehicle 1 based on the second detection value. In the second determination processing, the control unit 11 extracts the object and determines whether or not the object is a pedestrian. The control unit 11 calculates, for example, the width, height, movement speed, shape, etc., of the extracted object. In case of the control unit 11 determines that the object is a pedestrian by the second determination processing based on the second detection value, the control unit 11 extracts the pedestrian from the second detection value. The control unit 11 stores in the storage unit 12 second recognition results of the pedestrian extracted by the second determination processing based on the second detection value.

Figure 2:
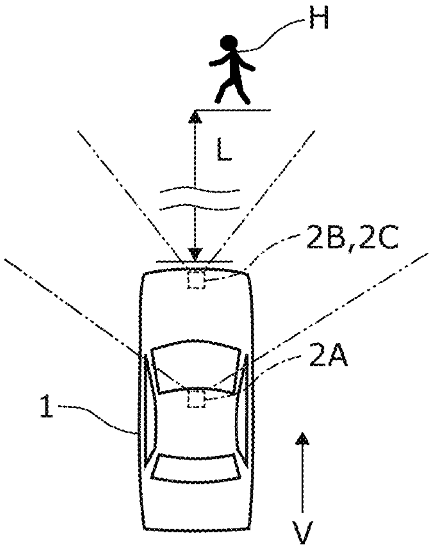
FIG. 2 is a view showing a state in which a pedestrian is present in front of a vehicle.

FIG. 2 shows a state in which a pedestrian H is present in front of the vehicle 1. The control unit 11 executes matching processing for matching the first recognition results of the first determination processing based on the first detection value with the second recognition results of the second determination processing based on the second detection value, which is different from the first detection value. The matching processing is processing in which the control unit 11 determines whether a plurality of different types of detection means show the same recognition results for the same object, and in case of it is determined that the same recognition results are shown for the same object, a match is determined.

The control unit 11 executes matching processing by treating an environment in which the first detection value and the second detection value can be sufficiently obtained as a normal state in which the accuracy of object recognition can be secured. The control unit 11 determines whether the first detection value and the second detection value simultaneously secure the accuracy of object recognition and whether the matching processing can be executed. In determining matching processing, the control unit 11 determines, for example, whether the first detection value and the second detection value satisfy a first condition. The first condition is set so as to include a preset threshold of the first detection value in the normal state and a preset threshold of the second detection value in the normal state.

The control unit 11 determines that the first condition is satisfied in case of it is determined that the first detection value is in a state in which the first determination processing can be executed by comparing the first detection value with the threshold, and in case of it is determined that the second detection value is in a state in which the second determination processing can be executed by comparing the second detection value with the threshold. The control unit 11 determines that the first condition is not satisfied in case of it is determined that a condition which decreases the accuracy of object recognition as compared to the normal state is present in the environment of the surroundings of the vehicle. For example, the control unit 11 determines that the first condition is not satisfied in case of it is determined that the first detection value is in a state in which the first determination processing cannot be executed by comparing the first detection value with the threshold, or in case of it is determined that the second detection value is in a state in which the second determination processing cannot be executed by comparing second detection value with the threshold.

The control unit 11 determines whether the object is a pedestrian H based on the first detection value and the second detection value in case of the first detection value and the second detection value simultaneously satisfy the first condition, which can secure the accuracy of object recognition. The control unit 11 executes matching processing using the first recognition results of the pedestrian H recognized from the first detection value and the second recognition results of the pedestrian H recognized from the second detection value. For example, the control unit 11 simultaneously recognizes the first recognition results and the second recognition results, calculates them at the same position, and determines that the object is a pedestrian H in case of the recognition accuracy of the pedestrian based on the first recognition results is equal to or greater than the threshold and the recognition accuracy of the pedestrian based on the second recognition results is equal to or greater than the threshold. In case of the control unit 11 determines, based on the determination results of the matching processing, that the object is a predetermined pedestrian H for whom avoidance assistance control is necessary, avoidance assistance control is executed.

In the matching processing, the control unit 11 measures a relative distance L between the pedestrian H and the vehicle 1 based on the second detection value detected by the lidar device 2B or the radar device 2C. The control unit 11 calculates the time to collision (TTC) until the vehicle 1 and the pedestrian H come into contact based on the distance L and a speed V of the vehicle 1. In case of the control unit 11 determines that the TTC is equal to or less than a threshold, it is determined that avoidance assistance control is necessary for the pedestrian H. In case of the control unit 11 recognizes a specific pedestrian H for whom avoidance assistance control is necessary, avoidance assistance control begins and the drive unit 5 and the braking unit 6 are controlled so as to decelerate the vehicle 1, whereby the vehicle 1 can be prevented from coming into contact with the pedestrian H.

In case of distance L is equal to or less than the threshold, the control unit 11 controls the drive unit 5 and the braking unit 6 so as to decelerate the vehicle 1, and controls the steering unit 7 to cause the vehicle 1 to avoid the pedestrian H, whereby avoidance assistance control to prevent the vehicle 1 from contacting the pedestrian H is executed.

Figure 3:
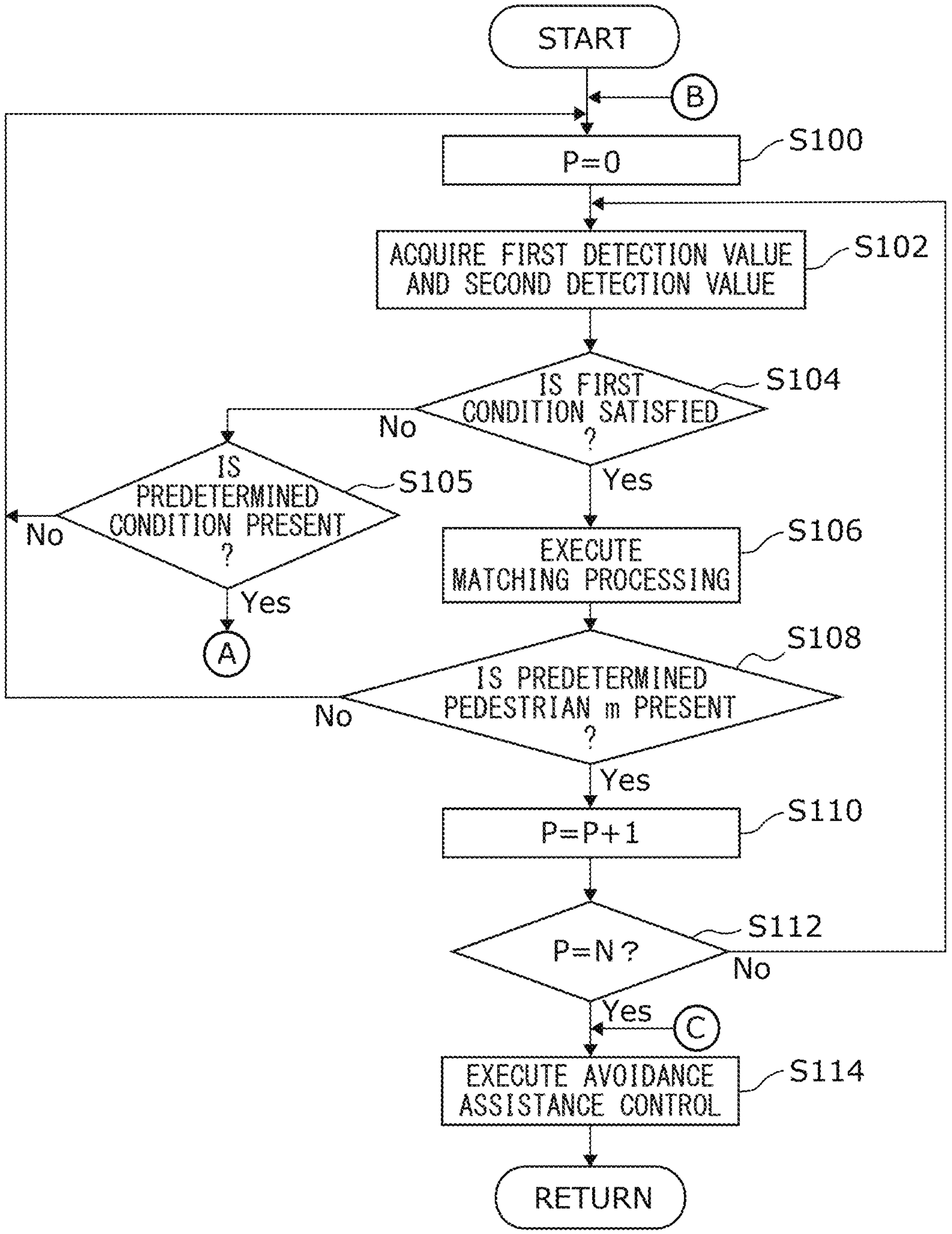
FIG. 3 is a flowchart showing the flow of processing of avoidance assistance control in a normal state.

FIG. 3 shows the flow of processing of an avoidance assistance control method executed by the vehicle controller 10 in the normal state. The avoidance assistance control method is executed by the control unit 11 based on a computer program installed in a computer which is mounted in the vehicle controller 10. The control unit 11 executes each of the following processes.

The control unit 11 sets the initial value of a counter value P used for the avoidance assistance control to 0 (step S100). The control unit 11 acquires the first detection value and the second detection value (step S102). The control unit 11 determines whether the first detection value and the second detection value simultaneously satisfy the first condition indicating that the accuracy of the recognition of the object can be secured (step S104). In case of the control unit 11 determines that the first detection value is in a state in which the first condition is not satisfied, the control unit 11 determines whether a predetermined condition is present (step S105). The state in which the first detection value does not satisfy the first condition is, for example, a state in which the environment exerts an influence on the detection value, such as the case in which a backlight condition is present, such as the presence of an oncoming vehicle with its headlights turned on.

The state in which the environment exerts an influence on the detection value may include specific backlight conditions such as poor visibility due to meteorological conditions, backlight conditions due to sunlight conditions such as sunset and sunrise, and backlight conditions at the exit of a tunnel. In case of the control unit 11 recognizes poor visibility due to meteorological conditions based on the detection value, the control unit 11 determines that a predetermined condition is present. In case of the control unit 11 determines that a backlight condition is present due to sunlight conditions based on the detection value, the control unit 11 determines that a predetermined condition is present. In case of the control unit 11 determines that a backlight condition is present at the exit of a tunnel based on the detection value, the control unit 11 determines that a predetermined condition is present. In case of the control unit 11 determines that a vehicle 1 also has its headlights turned on in a backlight condition in which an oncoming vehicle with its headlights turned on is present based on the detection value, as described below, the control unit 11 determines that a predetermined condition is present.

The state in which the second detection value does not satisfy the first condition is a state in which the environment exerts an influence on the detection value, such as in case of the second detection value is deteriorated due to rainfall or in case of snow is present on the exterior of the lidar device 2B and the radar device 2C and the second detection value is deteriorated. In case of the control unit 11 determines that the second detection value is deteriorated based on the detection value, it is determined that a predetermined condition is present. In case of the control unit 11 determines that a predetermined condition is present, the processing described below is executed. In case of the first detection value and the second detection value satisfy the first condition, the control unit 11 executes matching processing to match the first recognition results of the pedestrian based on the first detection value with the second recognition results of the pedestrian based on the second detection value (step S106).

The control unit 11 determines whether or not a specific pedestrian for whom avoidance assistance control is necessary is present based on the determination results of the matching processing and the TTC (step S108). In case of the control unit 11 determines that a specific pedestrian is present, 1 is added to the counter value P (step S110). The control unit 11 determines whether or not the counter value P has reached a preset threshold N (N is a natural number) of the matching match count (step S112). In case of the counter value P has not reached the threshold N of the matching match count, the control unit 11 returns the processing to step S102. In case of the counter value P has reached the threshold N of the matching match count, the control unit 11 executes avoidance assistance control (step S114). The control unit 11 can improve the accuracy of recognizing the pedestrian H by repeatedly executing the above processing.

Figure 4:
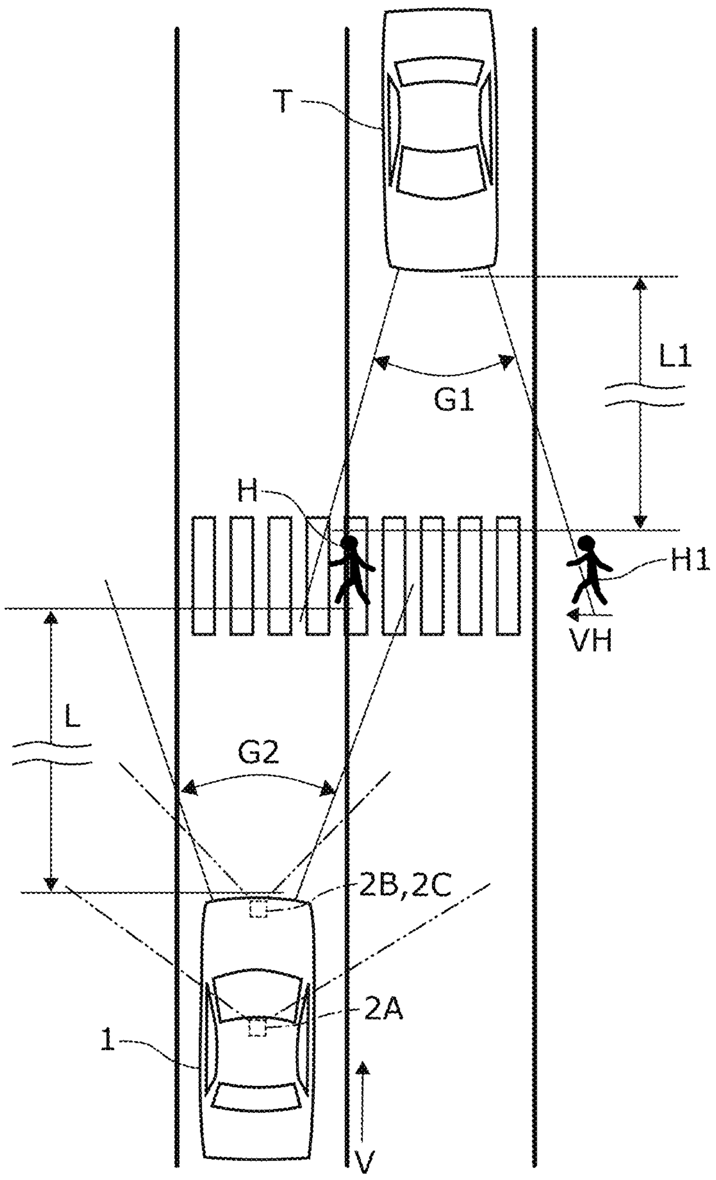
FIG. 4 is a view showing an example of an environment in which the visibility of pedestrians is reduced.

FIG. 4 shows an example of a predetermined condition under which it is difficult to recognize the pedestrian H due to the influence of the environment. An oncoming vehicle T is present in front of the vehicle 1, and the oncoming vehicle T has its headlights turned on. The vehicle 1 has its headlights turned on. The pedestrian H is present between the vehicle 1 and the oncoming vehicle. The pedestrian H is present within the illumination range of the headlights of the vehicle 1 and also within the illumination range of the headlights of the oncoming vehicle T.

As shown in the drawing, in case of the headlights of the oncoming vehicle T are turned on, the first detection value of the vehicle 1 becomes a backlit state. In a state in which the pedestrian H is within the illumination range G1 of the headlights of the oncoming vehicle T, it may be difficult for the vehicle 1 to recognize the pedestrian H. In this state, in a state in which the pedestrian H is within the illumination range G2 of the headlights of the vehicle 1, it may be even more difficult for the pedestrian H to be recognized from the vehicle 1.

The control unit 11 recognizes the pedestrian H based on the first detection value using image data captured by the vehicle exterior camera 2A. In case of there is a predetermined condition of the environment, such as backlight, which exerts an influence, it becomes difficult to recognize the pedestrian H in the image data, and the accuracy of the first recognition results by the control unit 11 are decreased as compared to the normal state.

The control unit 11 executes the following processing in case of a condition under which the accuracy of object recognition is decreased as compared to the normal state is satisfied in the environment of the surroundings of the vehicle 1. For example, in case of the accuracy of either the first recognition results or the second recognition results is decreased as compared to the normal state and matching processing cannot be performed, the control unit 11 determines whether or not a pedestrian for whom avoidance assistance control is necessary is present based on either the first recognition results or the second recognition results. In case of the accuracy of the first recognition results does not satisfy the first condition, the control unit 11 uses the second recognition results to determine whether or not a pedestrian for whom avoidance assistance control is necessary is present. A method for determining whether or not a pedestrian for whom avoidance assistance control is necessary is present in case of the condition under which the accuracy of object recognition is decreased as compared to the normal state is satisfied in the environment of the surroundings of the vehicle will be described below.

Figure 5:
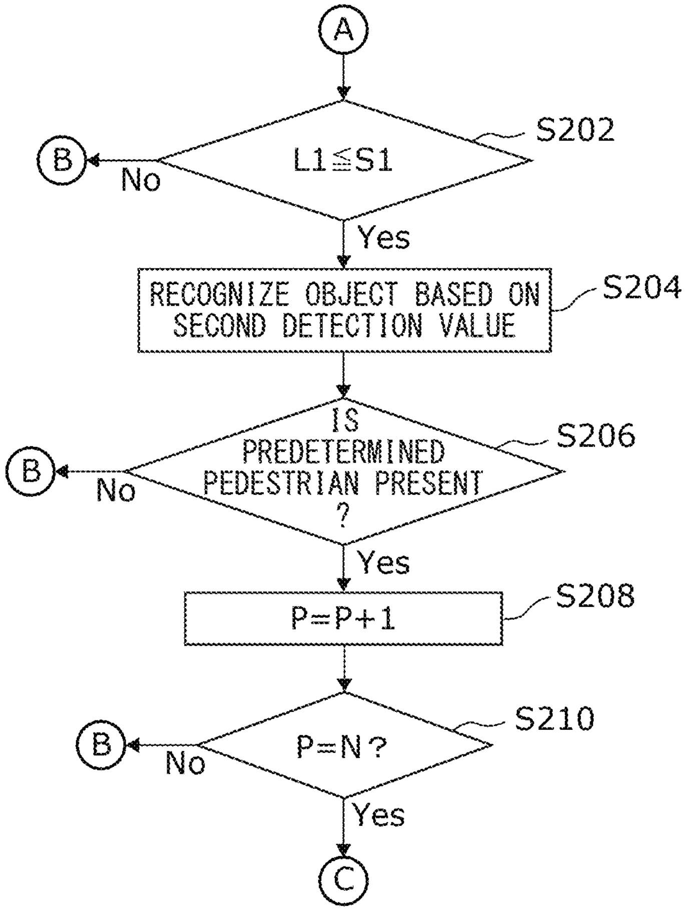
FIG. 5 is a flowchart showing the flow of avoidance assistance control processing which is executed in case of a condition that causes the accuracy of object recognition to decrease as compared to a normal state is satisfied in the environment of the surroundings of a vehicle.

FIG. 5 shows an example of processing flow for determining whether or not a pedestrian for whom avoidance assistance control is necessary is present in case of a condition under which the accuracy of object recognition is decreased as compared to the normal state is satisfied in the environment of the surroundings of the vehicle. In the illustrated example, the control unit 11 executes the second determination processing using the second detection value in case of, for example, matching processing based on the first recognition results by the vehicle exterior camera 2A cannot be performed and the object can be recognized based on the second detection value detected by the lidar device 2B or the radar device 2C. In case of the accuracy of object recognition by the first detector is decreased as compared to the normal state, the control unit 11 determines whether or not the object is a pedestrian for whom avoidance assistance control is necessary based on the second recognition results by the second detector without performing matching processing.

In step S104 (refer to FIG. 3), in case of the control unit 11 determines that the first determination processing cannot be sufficiently executed based on the first detection value and that the accuracy of the first recognition results is decreased as compared to the normal state (step S104: No), it is determined that the first condition is not satisfied. In case of the control unit 11 determines that the first detection value is in a state in which the first condition is not satisfied, it is determined whether a predetermined condition is present (step S105). In case of the control unit 11 determines that a predetermined condition is not present, the processing returns to step S100 (refer to FIG. 3).

In case of the control unit 11 determines that a predetermined condition is present, it is determined whether a distance L1 between the oncoming vehicle T and the object is within the range of a specified distance S1 based on the second detection value (step S202). In case of the distance L1 between the oncoming vehicle T and the object (pedestrian H) is within the range of the specified distance S1 (step S202: Yes), the control unit 11 executes the second determination processing using the second detection value to recognize the object (step S204).

The control unit 11 determines whether the object is a pedestrian based on the determination results of the second determination processing using the second detection value (step S206). In case of the object is a pedestrian H, the control unit 11 determines that the distance between the pedestrian H and the oncoming vehicle T is within the specified distance S1, the TTC is within the threshold, and avoidance assistance control is necessary. In case of the control unit 11 determines that a predetermined pedestrian is present based on the determination results of the second determination processing using the second detection value, 1 is added to the counter value P (step S208). The control unit 11 determines whether the counter value P has reached a preset threshold N of the matching match count (step S210).

In case of the counter value P has not reached the threshold N of the matching match count, the control unit 11 returns the processing to step S100 (refer to FIG. 3). In case of the counter value P has reached the threshold N of the matching match count, the control unit 11 advances the processing to step S114 and executes avoidance assistance control (refer to FIG. 3). According to the processing described above, even if a predetermined condition such as the influence of the environment such as a backlight condition is present and matching processing cannot be performed based on the image data of the vehicle exterior camera 2A, the control unit 11 can determine the presence of a predetermined pedestrian H by executing the second determination processing based on the second detection value using the lidar device 2B or the radar device 2C.

Figure 6:
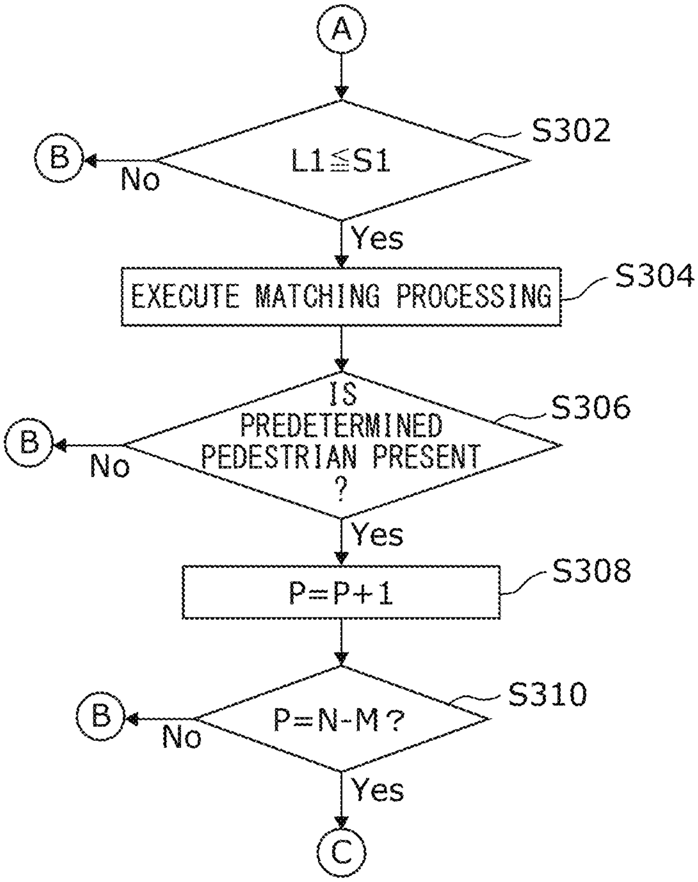
FIG. 6 is a flowchart showing the flow of avoidance assistance control processing which is executed in case of a condition that causes the accuracy of object recognition to decrease as compared to a normal state is satisfied in the environment of the surroundings of a vehicle.

FIG. 6 shows another example of processing flow in case of determining whether or not a pedestrian for whom avoidance assistance control is necessary is present in case of a condition under which the accuracy of object recognition is decreased as compared to the normal state is satisfied in the environment of the surroundings of the vehicle. In step S104 (refer to FIG. 3), in case of the control unit 11 determines that the first determination processing does not satisfy the first condition based on the first detection value (step S104: No), it is determined whether or not a predetermined condition is present (step S105). In case of the control unit 11 determines that a predetermined condition is not present, the processing returns to step S100 (refer to FIG. 3).

In case of the control unit 11 determines that a predetermined condition is present, it is determined whether or not the distance L1 between the oncoming vehicle T and the pedestrian H is within the range of the specified distance S1 based on the second detection value (step S302). In case of the distance L1 between the oncoming vehicle T and the pedestrian H is within the range of the specified distance S1 based on the second recognition results of the second determination processing, the control unit 11 executes matching processing to match the first recognition results based on the first detection value for the object with the second recognition results based on the second detection value for the object (step S304).

The control unit 11 determines whether or not a predetermined pedestrian for whom avoidance assistance control is necessary is present based on the determination results of the matching processing (step S306). In case of the control unit 11 determines that a predetermined pedestrian is present, 1 is added to the counter value P (step S308). The control unit 11 reduces the threshold for the matching match count. For example, the control unit 11 determines whether or not the counter value P has reached a threshold (N-M) of the matching match count obtained by subtracting a predetermined value M (M is a natural number smaller than N) from the preset threshold N of the matching match count (step S310).

In case of the counter value P has not reached the threshold (N-M) of the matching match count, the control unit 11 returns the processing to step S100 (refer to FIG. 3). In case of the counter value P has reached the threshold (N-M) of the matching match count, the control unit 11 advances the processing to step S114 and executes avoidance assistance control (refer to FIG. 3). According to the above processing, even if the determination processing based on the detection value does not satisfy the first condition due to the influence of the environment such as a backlight condition, the control unit 11 can determine the presence of a predetermined pedestrian H and execute avoidance assistance control by reducing the threshold for the matching match count used in the matching processing.

Figure 7:
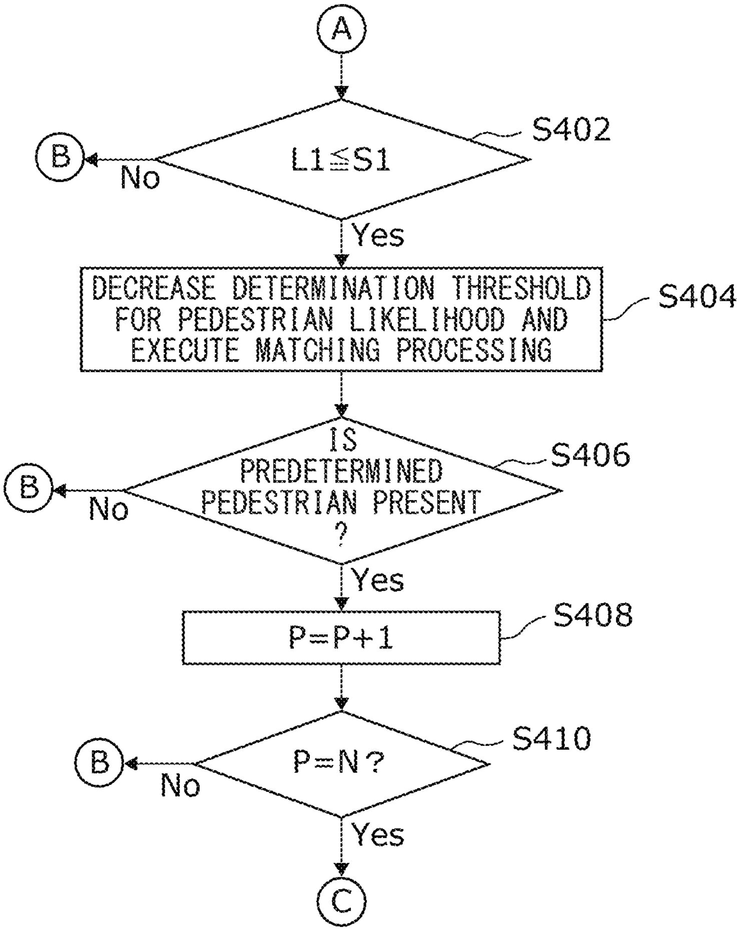
FIG. 7 is a flowchart showing the flow of avoidance assistance control processing which is executed in case of a condition that causes the accuracy of object recognition to decrease as compared to a normal state is satisfied in the environment of the surroundings of a vehicle.

FIG. 7 shows another example of the processing flow in case of determining whether or not a pedestrian for whom avoidance assistance control is necessary is present in case of a condition under which the accuracy of object recognition is decreased as compared to the normal state is satisfied in the environment of the surroundings of the vehicle. In case of the control unit 11 determines in step S104 (refer to FIG. 3) that the first determination processing based on the first detection value does not satisfy the first condition (step S104: No), it is determined whether or not a predetermined condition is present (step S105). In case of the control unit 11 determines that a predetermined condition is not present, the processing returns to step S100 (refer to FIG. 3).

In case of the control unit 11 determines that a predetermined condition is present, it is determined whether or not the distance L1 between the oncoming vehicle T and the pedestrian H is within the range of the specified distance S1 based on the second detection value (step S402). In case of the distance L1 between the oncoming vehicle T and the pedestrian H is within the range of the specified distance S1, the control unit 11 executes matching processing (step S404).

In step S404, the control unit 11 decreases the determination threshold for pedestrian likelihood, which is an index for estimating pedestrians, and executes matching processing. The pedestrian likelihood is the probability density that an object is estimated to be a pedestrian in case of the object is recognized using the detection value. In case of a condition under which the accuracy of object recognition based on the first detection value and/or the second detection value is decreased as compared to the normal state is satisfied, the control unit 11 reduces the threshold for pedestrian likelihood and executes matching processing.

For example, in case of the accuracy of the first detection value cannot be secured, the control unit 11 decreases the determination threshold of a first pedestrian likelihood used in the first determination processing and executes the first determination processing. The control unit 11 decreases a threshold (A-α) obtained by subtracting a predetermined value α from a first threshold A of the preset first pedestrian likelihood used in the first determination processing and executes the first determination processing. The control unit 11 decreases the determination threshold of the first pedestrian likelihood, executes the first determination processing, and executes the second determination processing.

In case of the accuracy of the second detection value cannot be secured, the control unit 11 decreases the determination threshold of a second pedestrian likelihood used in the second determination processing and executes the second determination processing. The control unit 11 decreases a threshold (B−β) obtained by subtracting a predetermined value β from a second threshold B of the preset second pedestrian likelihood used in the second determination processing and executes the second determination processing. The control unit 11 executes matching processing using the first recognition results of the first determination processing and the second recognition results of the second determination processing with the reduced determination thresholds. In case of the accuracy of the first detection value and the second detection value cannot be secured, the control unit 11 may execute matching processing using the first recognition results for which the determination threshold of the first pedestrian likelihood is reduced and the second recognition results of the second determination processing for which the determination threshold of the second pedestrian likelihood is reduced.

The control unit 11 determines whether or not a specific pedestrian for whom avoidance assistance control is necessary is present based on the determination results of the matching processing (step S406). In case of the control unit 11 determines that a specific pedestrian is present, 1 is added to the counter value P (step S408). The control unit 11 determines whether or not the counter value P has reached the preset matching match count threshold N (step S410).

In case of the counter value P has not reached the matching match count threshold N, the control unit 11 returns the processing to step S100 (refer to FIG. 3). In case of the counter value P has reached the matching match count threshold N, the control unit 11 advances the processing to step S114 and executes avoidance assistance control (refer to FIG. 3).

In the matching processing of step S404, the control unit 11 may perform pedestrian determination using the pedestrian speed at which the pedestrian H crosses the road instead of or in addition to the pedestrian determination using the pedestrian likelihood. The control unit 11 determines whether an error between the pedestrian speed at which the pedestrian H crosses the road based on the first recognition results and the pedestrian speed at which the pedestrian H crosses the road based on the second recognition results is within a threshold in the matching processing. In case of the error in the pedestrian speed in the matching processing is within the threshold, the control unit 11 determines that the objects are the same pedestrian. In case of the detection value is not sufficiently obtained and the accuracy of object recognition is decreased as compared to the normal state, the control unit 11 increases the error threshold of the pedestrian speed in the matching processing as compared to the normal state and executes the matching processing.

In case of the control unit 11 recognizes a pedestrian H1 near a road (refer to FIG. 4) in the environment of the surroundings of the vehicle and a condition under which the accuracy of object recognition is decreased as compared to the normal state is satisfied, the control unit 11 determines whether or not the pedestrian H1 is likely to cross the road. In case of the control unit 11 determines whether the pedestrian H1 is likely to cross the road, the control unit 11 decreases the threshold criterion used to determine a pedestrian H (refer to FIG. 4) crossing the road and executes determination processing.

For example, in case of a condition under which the accuracy of object recognition is decreased as compared to the normal state is satisfied in the environment of the surroundings of the vehicle, the control unit 11 uses a threshold (VH1−C1) obtained by subtracting a predetermined value C1 from a preset first threshold VH1 in the first determination processing using the first detection value. The control unit 11 determines whether the pedestrian H1 is likely to cross the road based on a comparison result between a crossing speed VH of the pedestrian H1 and the threshold (VH1−C1).

In the second determination processing using the second detection value, the control unit 11 uses a threshold (VH2−C2) obtained by subtracting a predetermined value C2 from a preset second threshold VH2. The control unit 11 determines whether the pedestrian H2 is likely to cross based on a comparison result between the crossing speed VH of the pedestrian H2 and the threshold (VH2−C2). The control unit 11 executes matching processing using the first recognition results of the first determination processing for which the threshold is reduced and the second recognition results of the second determination processing for which the threshold is reduced.

According to the above processing, in case of the accuracy of object recognition in the environment of the surroundings of the vehicle is decreased as compared to the normal state, it can be determined whether or not a pedestrian H1 who is likely to cross the road is present by decreasing the threshold for the crossing speed of the pedestrian H1 and executing matching processing.

Figure 8:
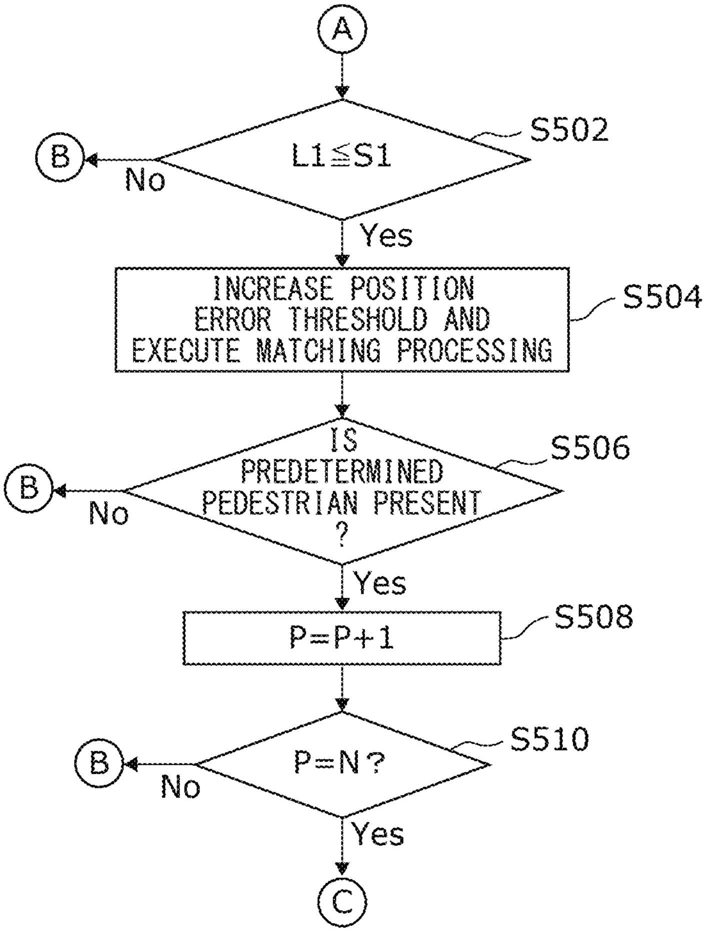
FIG. 8 is a flowchart showing the flow of avoidance assistance control processing which is executed in case of a condition that causes the accuracy of object recognition to decrease as compared to a normal state is satisfied in the environment of the surroundings of a vehicle.

FIG. 8 shows another example of another processing flow for determining whether or not a pedestrian for whom avoidance assistance control is necessary is present in case of a condition for the accuracy of object recognition to decrease compared to the normal state is satisfied in the environment of the surroundings of the vehicle. In step S104 (refer to FIG. 3), in case of the control unit 11 determines that the first condition is satisfied (step S104: Yes), matching processing for matching the first recognition results based on the first detection value for the object with the second recognition results based on the second detection value for the object is executed. In case of the matching results match in the matching processing and the control unit 11 determines that the object is a pedestrian for whom avoidance assistance control is necessary, and in case of the position error between the position of the pedestrian recognized from the first recognition results and the position of the pedestrian recognized from the second recognition results is less than or equal to a threshold, the control unit 11 executes avoidance assistance control (refer to step S114).

In case of the control unit 11 determines that the first determination processing based on the first detection value does not satisfy the first condition (step S104: No), it is determined whether or not a predetermined condition is present (step S105). In case of the control unit 11 determines that a predetermined condition is not present, the processing returns to step S100 (refer to FIG. 3).

In case of it is determined that a predetermined condition is present, the control unit 11 determines whether the distance L1 between the oncoming vehicle T and the pedestrian H is within the range of the specified distance S1 (step S502). In case of the distance L1 between the oncoming vehicle T and the pedestrian H is within the range of the specified distance S1, the control unit 11 increases the threshold for the pedestrian position error as compared to the normal state and executes matching processing (step S504).

The control unit 11 determines whether the object is a predetermined pedestrian for whom avoidance assistance control is necessary based on the determination results of the matching processing (step S506). In case of the control unit 11 determines that a predetermined pedestrian is present, 1 is added to the counter value P (step S508). The control unit 11 determines whether the counter value P has reached the preset matching match count threshold N (step S510).

In case of the counter value P has not reached the threshold N of the matching match count, the control unit 11 returns the processing to step S100 (refer to FIG. 3). In case of the counter value P has reached the threshold N of the matching match count, the control unit 11 advances the processing to step S114 and executes avoidance assistance control (refer to FIG. 3). According to the above processing, even if the accuracy of object recognition is deceased as compared to the normal state due to the influence of the environment such as a backlight condition, the allowable range (threshold) of the position error is increased as compared to the normal state, and the recognition frequency of the pedestrian H is increased.

As described above, according to the vehicle controller 10, even if the oncoming vehicle T is in a backlight state such as a state in which its headlights are turned on and the headlights of the vehicle 1 are also in a turned-on state and the detection value makes it difficult to perform pedestrian determination processing, delays in the pedestrian determination processing and delays in the avoidance assistance control can be suppressed.

In the embodiments described above, the computer program executed by each component of the vehicle controller 10 may be provided in a form recorded on a computer-readable portable non-transitory recording medium such as a semiconductor memory, a magnetic recording medium, or an optical recording medium. The computer program may be provided as a program product.

The invention claimed is:

1. A vehicle controller for executing avoidance assistance control for causing a vehicle to decelerate or avoid in case of an object is recognized in front of the vehicle based on a first detection value and a second detection value for detecting an environment of surroundings of the vehicle, wherein a processor included in a computer which is mounted in the vehicle controller is configured so as to execute the following processing:

perform matching processing for matching first recognition results based on the first detection value for the object, and second recognition results based on the second detection value for the object, execute the avoidance assistance control in case of matching results of the object in the matching processing match and it is determined that the object is a pedestrian for whom the avoidance assistance control is necessary, and in case of a matching match count by the matching processing is equal to or greater than a threshold for the matching match count, and reduce the threshold for the matching match count in case of a condition under which recognition accuracy of the object is decreased as compared to a normal state is satisfied in the environment of the surroundings of the vehicle.

2. A vehicle controller for executing avoidance assistance control for causing a vehicle to decelerate or avoid in case of an object is recognized in front of the vehicle based on a first detection value and a second detection value for detecting an environment of surroundings of the vehicle, wherein a processor included in a computer which is mounted in the vehicle controller is configured so as to execute the following processing:

perform matching processing for matching first recognition results based on the first detection value for the object, and second recognition results based on the second detection value for the object, execute the avoidance assistance control in case of matching results of the object in the matching processing match and it is determined that the object is a pedestrian for whom the avoidance assistance control is necessary, and in case of a speed error between a movement speed of the pedestrian recognized from the first recognition results and a movement speed of the pedestrian recognized from the second recognition results is equal to or less than a threshold, and increase the threshold for the speed error in case of a condition under which recognition accuracy of the object is decreased as compared to a normal state is satisfied in the environment of the surroundings of the vehicle.

3. The vehicle controller according to claim 1, wherein the processor is configured to execute the following processing:

execute the avoidance assistance control in case of matching results of the object in the matching processing match and it is determined that the object is the pedestrian for whom the avoidance assistance control is necessary, and in case of a position error between a position of the pedestrian recognized from the first recognition results and a position of the pedestrian recognized from the second recognition results is equal to or less than a threshold for the position error, and increase the threshold for the position error in case of a condition under which recognition accuracy of the object is decreased as compared to a normal state is satisfied in the environment of the surroundings of the vehicle.

4. The vehicle controller according to claim 1, wherein the processor is configured to execute the following processing:

execute the avoidance assistance control in case of matching results of the object in the matching processing match and it is determined that the object is the pedestrian for whom the avoidance assistance control is necessary, and in case of a pedestrian likelihood, which is an index for estimating the pedestrian based on the first detection value and the second detection value is equal to or greater than a threshold for the pedestrian likelihood, and reduce the threshold for the pedestrian likelihood in case of a condition under which recognition accuracy of the object based on the first detection value and/or the second detection value is decreased as compared to a normal state is satisfied in the environment of the surroundings of the vehicle.

* * * * *